(12) United States Patent
Xiang et al.

(10) Patent No.: US 11,022,574 B2
(45) Date of Patent: Jun. 1, 2021

(54) METHOD AND APPARATUS FOR RAPID MEASUREMENT OF THERMAL CONDUCTIVITY OF A THIN FILM MATERIAL

(71) Applicants: Xiao-dong Xiang, Danville, CA (US); Yuewei Wu, Ningbo (CN); Xiao-ping Wang, Shanghai (CN)

(72) Inventors: Xiao-dong Xiang, Danville, CA (US); Yuewei Wu, Ningbo (CN); Xiao-ping Wang, Shanghai (CN)

( * ) Notice: Subject to any disclaimer, the term of this patent is extended or adjusted under 35 U.S.C. 154(b) by 0 days.

(21) Appl. No.: 16/365,333

(22) Filed: Mar. 26, 2019

(65) Prior Publication Data

US 2019/0391095 A1 Dec. 26, 2019

Related U.S. Application Data

(60) Provisional application No. 62/648,708, filed on Mar. 27, 2018.

(51) Int. Cl.
*G01N 25/18* (2006.01)
(52) U.S. Cl.
CPC .................................. *G01N 25/18* (2013.01)
(58) Field of Classification Search
CPC ...................................................... G01N 25/18
See application file for complete search history.

(56) References Cited

U.S. PATENT DOCUMENTS

| 10,690,588 B2* | 6/2020 | Wang ......................... H01S 3/10 |
| 2005/0002436 A1* | 1/2005 | Taketoshi ............... G01N 25/20 |
| | | 374/43 |

(Continued)

FOREIGN PATENT DOCUMENTS

JP 2002303597 A * 10/2002

OTHER PUBLICATIONS

Chinese Office Action, dated Jul. 30, 2019, in a counterpart Chinese patent application, No. CN 201711130271.9.

(Continued)

*Primary Examiner* — Patrick O Neill
(74) *Attorney, Agent, or Firm* — Chen Yoshimura LLP

(57) ABSTRACT

The invention discloses a method and a apparatus for rapid measurement of thermal conductivity of a thin film material. The apparatus comprises a control device, a clock synchronizer, a laser, a rapid thermometer and a thermal conductivity output device; the control device and the clock synchronizer are signally connected, and the clock synchronizer is simultaneously signally connected with the laser and the rapid thermometer; in the working state, the control device sends a start signal to the clock synchronizer, and the laser and the rapid thermometer coordinately cooperate, and the laser emits laser light to the surface of the sample; at the same time, the rapid thermometer captures the surface temperature of the sample at the same specified position at different time points during the heating of the sample, and inputs the measured data into the thermal conductivity output device to obtain the thermal conductivity parameter. The apparatus of the invention has simple structure. The method of the invention is efficient and accurate. It can provide reliable parameter data for the thermal properties of various current ultra-thin semiconductor films.

10 Claims, 5 Drawing Sheets

(56) References Cited

U.S. PATENT DOCUMENTS

2014/0301424 A1* 10/2014 Adamczyk ............. G01N 25/20
  374/44
2019/0391094 A1* 12/2019 Xiang .................... G01N 25/18

OTHER PUBLICATIONS

Cai An, "Research on the Thermophysical Properties and New Measuring Apparatus Development for Thin Films", A Dissertation Submitted to Shanghai Jiaotong University for the Degree of Doctor of Philosophy, Aug. 15, 2013, published in China Doctoral Dissertations Full-text Database, Engineering vol. I, pp. B020-323.

* cited by examiner

METHOD AND APPARATUS FOR RAPID MEASUREMENT OF THERMAL CONDUCTIVITY OF A THIN FILM MATERIAL

FIELD OF INVENTION

This invention relates to the field of thermal measurement, and particularly relates to an apparatus and method for rapid measurement of thermal conductivity of a film material.

BACKGROUND

A variety of techniques have been developed for thin film thermal conductivity measurement. Some scholars measure the electrical conductivity of the metal film and then use Wiedemann-Franz's law to determine the thermal conductivity of the film. However, when the film thickness is very thin, it will no longer be suitable, and it is only suitable for metal film. The thermal conductivity of the film can also be measured by the micro-bridge method. However, the film is required to be in a substrate-free state, which inevitably requires that the thickness of the film material is not too thin, otherwise micro-bridge bridging of the film cannot be achieved. Goldsmid's dual thermocouple method for measuring thermal conductivity requires the deposition of dual thermocouples on the surface of the deposited sample. The deposited dual thermocouples can contaminate the composition of the sample. Hatta et al. use a periodic laser as a heating source to illuminate the film to be tested with a thickness d, and determine the thermal conductivity of the film based on the wavelength of the heat wave in the film. This is called periodic heat flow. The reflectivity of the femtosecond laser pump to detect the surface of the metal material changes with the temperature of the surface. When the amount of temperature change is small, it is proportional to the temperature change. According to this, the temperature change of the surface region can be determined by measuring the change in the reflectance of the surface of the material, thereby obtaining the thermophysical properties.

Although the deposition technique of industrial thin films has been widely used, there are still many difficulties in measuring the thermal conductivity of a film deposited on the surface of a substrate. There is still a lack of new apparatus and methods for measuring the thermal conductivity of thin film materials in the art.

SUMMARY OF THE INVENTION

The object of the present invention is to provide an apparatus and a method for rapid measurement of thermal conductivity of a thin film material. The present invention utilizes a laser instantaneous heating technique in combination with a rapid temperature measurement technique to measure the thermal conductivity of a thin film material. The apparatus of the present invention has a simple structure. The method is efficient and accurate. It can provide reliable parameter data for the current thermal properties of various ultra-thin semiconductor films.

The first aspect of the invention provides an apparatus for rapid measurement of thermal conductivity of a film material, in particular, the apparatus comprises a control device, a clock synchronizer, a laser, a rapid thermometer and a thermal conductivity output device; the control device is signally coupled to the clock synchronizer, and the clock synchronizer is simultaneously signally coupled to the laser and the rapid thermometer; in an operating state, the control device sends a start signal to the clock synchronizer, the laser and the fast thermometer coordinately cooperate, the laser emits laser light to the surface of the sample, and at the same time, the rapid thermometer captures a surface temperature of the sample at the same specified position at different points in time during heating of the sample, and inputs the measured data to the thermal conductivity output device to obtain a desired thermal conductivity parameter.

In some embodiments, the rapid thermometer is signally coupled to the thermal conductivity output device, and the thermal conductivity output device automatically reads data measured by the rapid thermometer.

In some embodiments, the rapid thermometer is signally coupled to the thermal conductivity output device, and the rapid thermometer directly transmits the measured data to the heat capacity output device.

In some embodiments, the data measured by the rapid thermometer is manually input to the thermal conductivity output device by an operator.

In some embodiments, the thermal conductivity output device comprises a display for displaying the thermal conductivity value.

In some embodiments, the control device is a computer.

In some embodiments, the thermal conductivity output device is a computer.

In some embodiments, the control device and the thermal conductivity output device are the same computer.

In some embodiments, the rapid thermometer is a line probe rapid thermometer.

In some embodiments, the thermal conductivity output device has a storage member for storing data and thermal conductivity values measured by the rapid thermometer.

In some embodiments, the thermal conductivity output device outputs the stored data in the form of a spreadsheet for easy viewing and summary by the operator.

In some embodiments, the sample includes a thin film and a substrate, the thin film covering a surface of the substrate, and the laser is irradiated onto the thin film.

In some embodiments, the workflow of the thermal conductivity output device is:

a) based on the data measured from the rapid thermometer, obtaining a set of surface temperature values $T(\tau_i)$ of the sample at the same specified position at different time points during the heating of the sample; where i is the ith time point, and $1 \leq i$;

b) assume a thermal conductivity corresponding to time point $\tau_i$, and calculating the surface temperature value $\theta(\tau_i)$ of the sample by the following heat transfer formula:

$$\lambda\left(\frac{1}{r}\frac{\partial T}{\partial r} + \frac{\partial^2 T}{\partial r^2}\right) + E = \rho c \frac{\partial T}{\partial \tau}$$

where $\lambda$ is the thermal conductivity of the thin film, $\rho$ is the density of the thin film, c is the specific heat capacity of the thin film, E is the heat flux density of the laser, and the value of E is zero in the area outside the spot;

c) compare $T(\tau_i)$ and $\theta(\tau_i)$, determine if $|T(\tau_i)-\theta(\tau_i)|<2$;

d) if $|T(\tau_i)-\theta(\tau_i)|<2$ is established, save the corresponding thermal conductivity $\theta(\tau_i)$, and calculate the next time point;

e) if $|T(\tau_i)-\theta(\tau_i)|<2$ is not established, re-assume the thermal conductivity corresponding to the time point $\tau_i$, repeat step b) and step c) until $|T(\tau_i)-\theta(\tau_i)|<2$ is established; save the corresponding thermal conductivity $\theta(\tau_i)$, and calculate the next time point;

f) when all the i time points are calculated, root mean square average of all calculated thermal conductivities, the average thermal conductivity of the film is finally obtained.

The second aspect of the invention provides a method for rapid measurement of thermal conductivity of a thin film material, in particular, the method comprises:

a) providing the apparatus of claim 6, rapidly heating the sample with a laser, and measuring the surface temperature of the sample at the same specified position at different time points during the heating process by a rapid thermometer;

b) based on the data measured from the rapid thermometer, obtaining a set of surface temperature values $T(\tau_i)$ of the sample at the same specified position at different time points during the heating of the sample; where i is the ith time point, and $1 \leq i$;

c) assume a thermal conductivity corresponding to time point $\tau_i$, and calculating the surface temperature value $\theta(\tau_i)$ of the sample by the following heat transfer formula:

$$\lambda \left( \frac{1}{r} \frac{\partial T}{\partial r} + \frac{\partial^2 T}{\partial r^2} \right) + E = \rho c \frac{\partial T}{\partial \tau}$$

where $\lambda$ is the thermal conductivity of the thin film, $\rho$ is the density of the thin film, c is the specific heat capacity of the thin film, E is the heat flux density of the laser, and the value of E is zero in the area outside the spot;

d) compare $T(\tau_i)$ and $\theta(\tau_i)$, determine if $|T(\tau_i)-\theta(\tau_i)|<2$;

e) if $|T(\tau_i)-\theta(\tau_i)|<2$ is established, save the corresponding thermal conductivity $\theta(\tau_i)$, and calculate the next time point;

f) if $|T(\tau_i)-\theta(\tau_i)|<2$ is not established, re-assume the thermal conductivity corresponding to the time point $\tau_i$, repeat step b) and step c) until $|T(\tau_i)-\theta(\tau_i)|<2$ is established; save the corresponding thermal conductivity $\theta(\tau_i)$, and calculate the next time point;

g) when all the i time points are calculated, root mean square average of all calculated thermal conductivities, the average thermal conductivity of the film is finally obtained.

In some embodiments, the method is based on laser heating, and the heat conduction process of the thin film conforms to the Fourier heat conduction law, and the heating process of the laser in the circular region is simplified to the one-dimensional heat conduction process in the cylindrical coordinate system.

In some embodiments, the method is to obtain the thermal conductivity of the thin film by solving the heat conduction equation in the reverse direction.

It is to be understood that within the scope of the present invention, the various technical features of the present invention and the various technical features specifically described hereinafter (as in the embodiments) may be combined with each other to constitute a new or preferred technical solution. Due to space limitations, we will not repeat them here.

BRIEF DESCRIPTION OF THE DRAWINGS

In order to clearly illustrate the embodiments of the present invention or the technical solutions in the prior art, the drawings to be used in the embodiments or the prior art description will be briefly described below. Obviously, the drawings in the following description are only some embodiments of the invention, and other drawings may also be obtained from those ordinary skilled in the art without any creative work.

In each drawing, the labels are as follows:
101—Controlled computer;
102—Clock synchronizer;
103—Laser;
104—Rapid thermometer;
105—Sample.

DETAILED DESCRIPTION

Through extensive and in-depth research, the inventors have for the first time developed a new apparatus and method for rapid measurement of thermal conductivity of a thin film material through extensive screening. The invention utilizes the laser instantaneous heating technology and combines the rapid temperature measurement technology to calculate the thermal conductivity of the thin film material, and the invention is completed on the basis of the above.

The invention provides a new apparatus and method for rapid measurement of thermal conductivity of a thin film material. The invention combines the laser heating technology with a high-speed temperature measurement technology to realize the measurement of the thermal conductivity of the thin film material.

Typically, the apparatus for rapid measurement of thermal conductivity of a thin film material of the present invention triggers a clock synchronizer through a computer control system that simultaneously triggers a laser and temperature acquisition system. The laser light from the laser heats the surface of the material to measure the temperature change at the edge temperature of the spot. Then, the collected temperature data is subjected to calculation processing to obtain the thermal conductivity of the thin film material.

The method for rapid measurement of thermal conductivity of a thin film material of the invention utilizes a laser rapid heating and a high-speed temperature measuring system to quickly obtain a temperature at a specified position of a surface of a thin film material at different times. And then inverse calculation of the heat conduction equation to calculate the thermal conductivity of the film material.

The thickness of the thin film is generally from about ten nanometers to several micrometers, the thickness of the substrate is in the order of millimeters, and the geometric difference between the film and the substrate is usually more than two orders of magnitude. Accordingly, approximating the substrate to a semi-infinite model does not change the thermal response of the thin film during the laser heating process.

Figure 1:
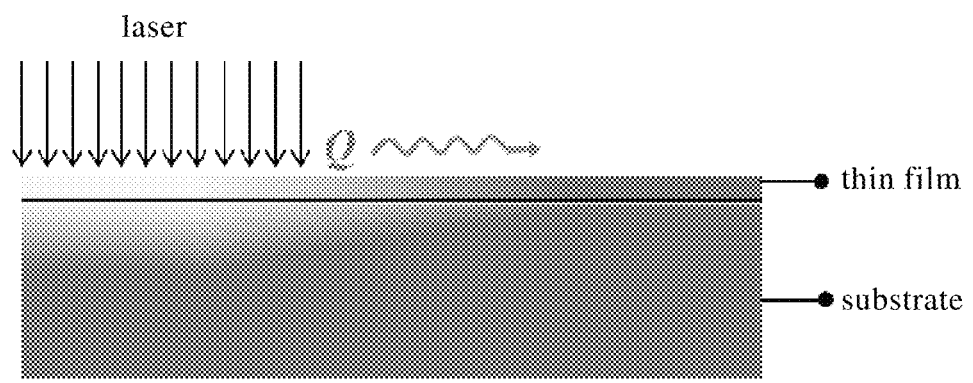
FIG. 1 is a diagram showing a laser heating model in one embodiment of the present invention.

As shown in FIG. 1, after the think film material is irradiated by the laser, physical processes such as absorption, temperature rise, and heat conduction occur in the material.

(I) The Thin Film Absorbs the Incident Laser and Heats Up:

According to the principle of laser heating, the absorption of laser light by the film material satisfies the following formula:

$$\Delta I_a(x) \approx (1-R) I \cdot \delta e^{-\delta x} \quad (1)$$

Where $\Delta I_a(x)$ represents the absorption power of the thin film at a unit thickness from the surface depth x of the film. I is the power of the laser to reach the surface of the material. R is the reflectivity of the thin film system. δ is the absorption coefficient of the thin film system. The thin film is heated at power of $\Delta I_a(x)$ to increase the temperature. When the substrate coefficient is negligible (such as a low coefficient or a thick film), the total heat $Q_a(T)$ absorbed by the film satisfies the formula:

$$Q_a(\tau) = \int_0^d \Delta I_a(x) dx \cdot \tau \quad (2)$$

where d is the thickness of the thin film, τ is the heating time.

Figure 2:
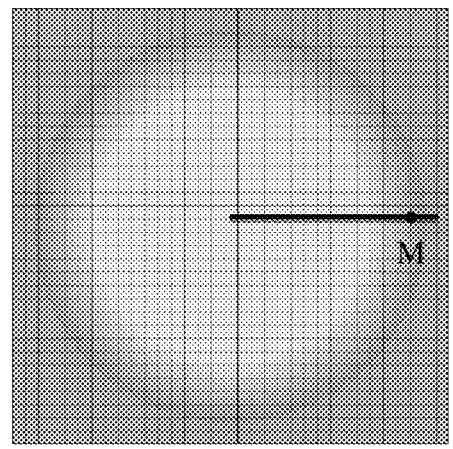
FIG. 2 is a diagram showing the energy spatial light distribution of the generated spot by the laser that strikes the surface of the film in one embodiment of the present invention.
Figure 3:
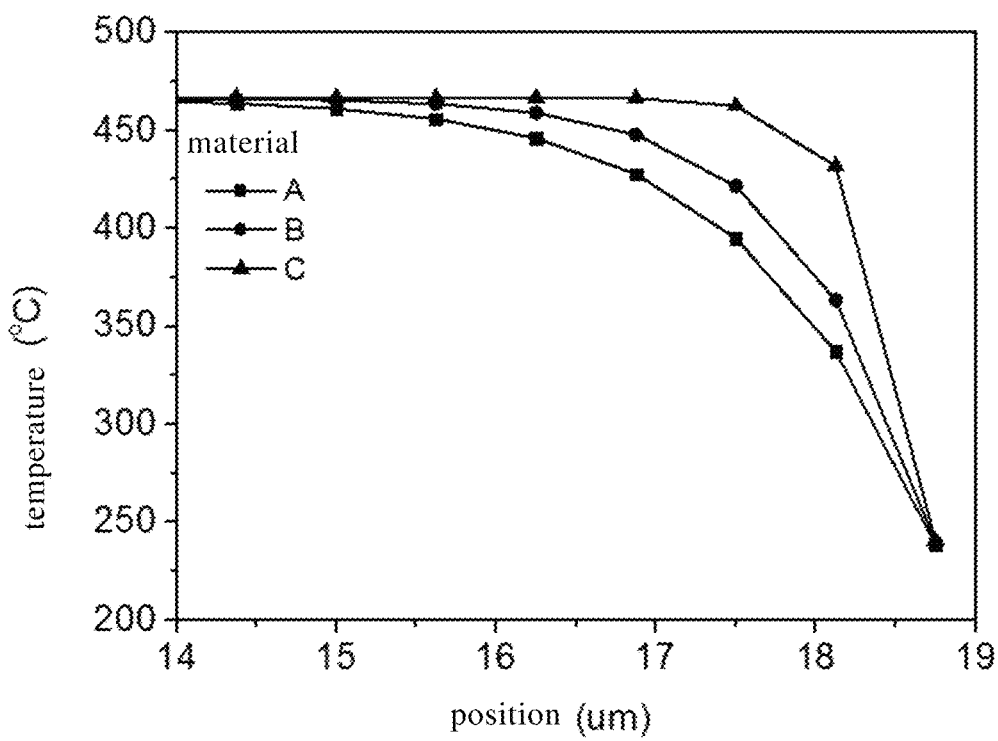
FIG. 3 is a spatial distribution diagram of the temperature in one embodiment of the present invention.

(II) Heat Conduction:

Using finite element to simulate three different thermal conductivity materials at the same heating time and the same heating temperature, the temperature variation regularity can be obtained as shown in FIG. 3 by the behavior of temperature along the solid path in FIG. 2. The thermal conductivity of the three materials is A>B>C. It can be seen from FIG. 3 that the greater the thermal conductivity of the material, the greater the gradient of temperature versus space. So temperature versus spatial gradient behavior can characterize the thermal conductivity of a material.

Figure 4:
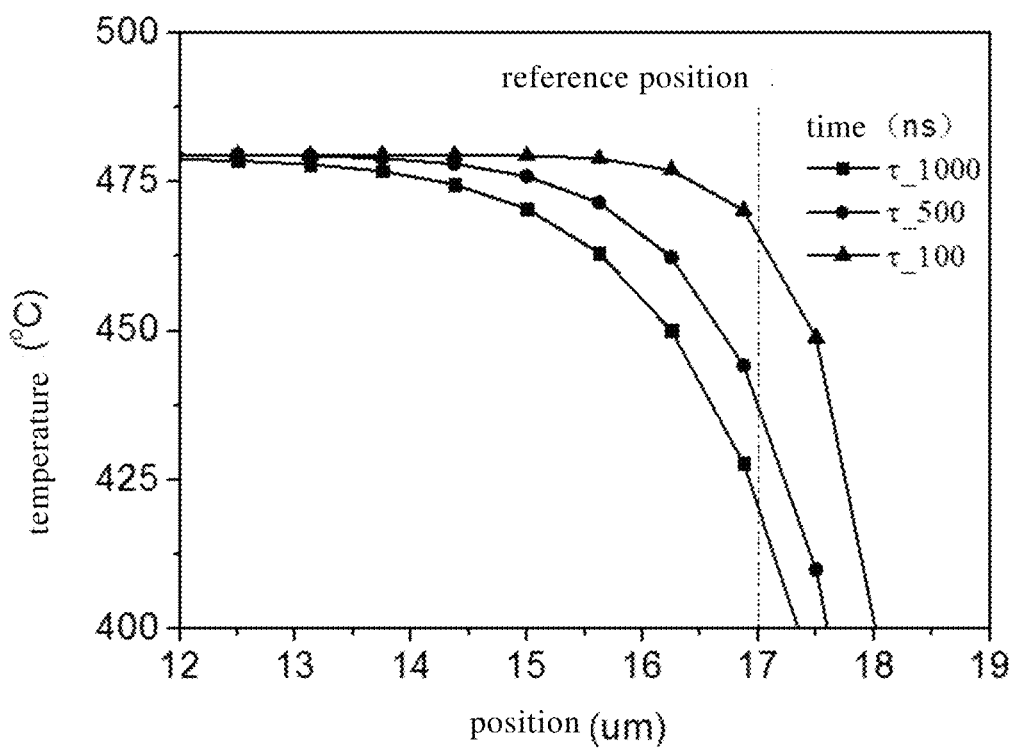
FIG. 4 is a temperature graph of different heating times in one embodiment of the present invention.

FIG. 4 is a finite element simulated graph showing the temperature distribution of the surface of the material in a laser heating at different times (when τ is 1000 ns, τ is 500 ns, and τ is 100 ns). Although the surface temperature of the material is constant, as the time increases, the temperature of the specified reference position (for example, at the position of 17 um in FIG. 4) gradually decreases. The temperature of the specified reference point at a given time is in one-to-one correspondence with the thermal conductivity of the material. When the temperature $T_1 \sim T_N$ of N time points are continuously measured, in principle, it will correspond to N thermal conductivity $\lambda_1 \sim \lambda_N$ (each fluctuating within the deviation range). Therefore, the temperature and thermal conductivity in the heat conduction equation are also corresponding one-to-one.

However, in the process of laser heating and film heating, the heat transfer process to the unheated film region and to the substrate is unavoidable. In the process of heating the thin film material by the laser, since the temperature in the spot is higher than outside the spot, the energy in the spot is transmitted outward, as the heat transfer of Q shown in FIG. 1. Since the thermal conductivity of different materials is different, the gradient of the temperature distribution caused by the heat propagation in the radial direction of the spot is different. The behavior of the change in temperature of the spot is shown in a plan view in FIG. 2. The temperature gradually decreases from the center of the spot toward the edge, as shown by the solid line in FIG. 2.

The heat conduction process of the laser-heated film material conforms to Fourier's law of heat conduction. The laser heated spot is a circular area, so heat will spread around. Due to the absolute symmetry of the circle, the two-dimensional heat conduction behavior of the laser on the surface of the material can be simplified by one-dimensional heat conduction along the path direction in FIG. 2. The temperature diffusion from the circle to the periphery can be understood as a one-dimensional heat conduction process in the cylindrical coordinate system:

$$\lambda \left( \frac{1}{r} \frac{\partial T}{\partial r} + \frac{\partial^2 T}{\partial r^2} \right) + E = \rho c \frac{\partial T}{\partial \tau} \quad (3)$$

where λ is the thermal conductivity of the thin film, ρ is the density of the thin film, c is the specific heat capacity of the thin film, E is the heat flux density of the laser, and the value of E is zero in the area outside the spot.

Using finite difference techniques or finite element techniques, the temperature field T(r, τ) can be obtained at any position and at any time under given boundary conditions (convection, radiation, heat conduction) and initial conditions (temperature, heat source).

Figure 7:
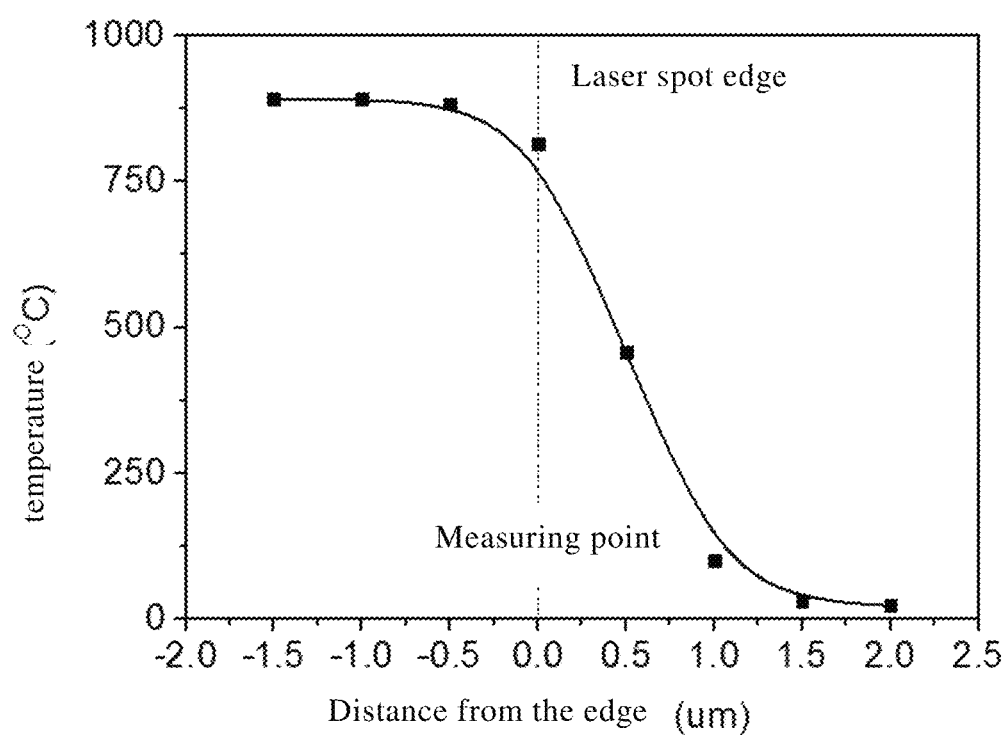
FIG. 7 is a graph showing the temperature distribution of the edge of the spot of the film of material H of FIG. 6 when heated for 10 ns in one embodiment of the present invention.
Figure 8:
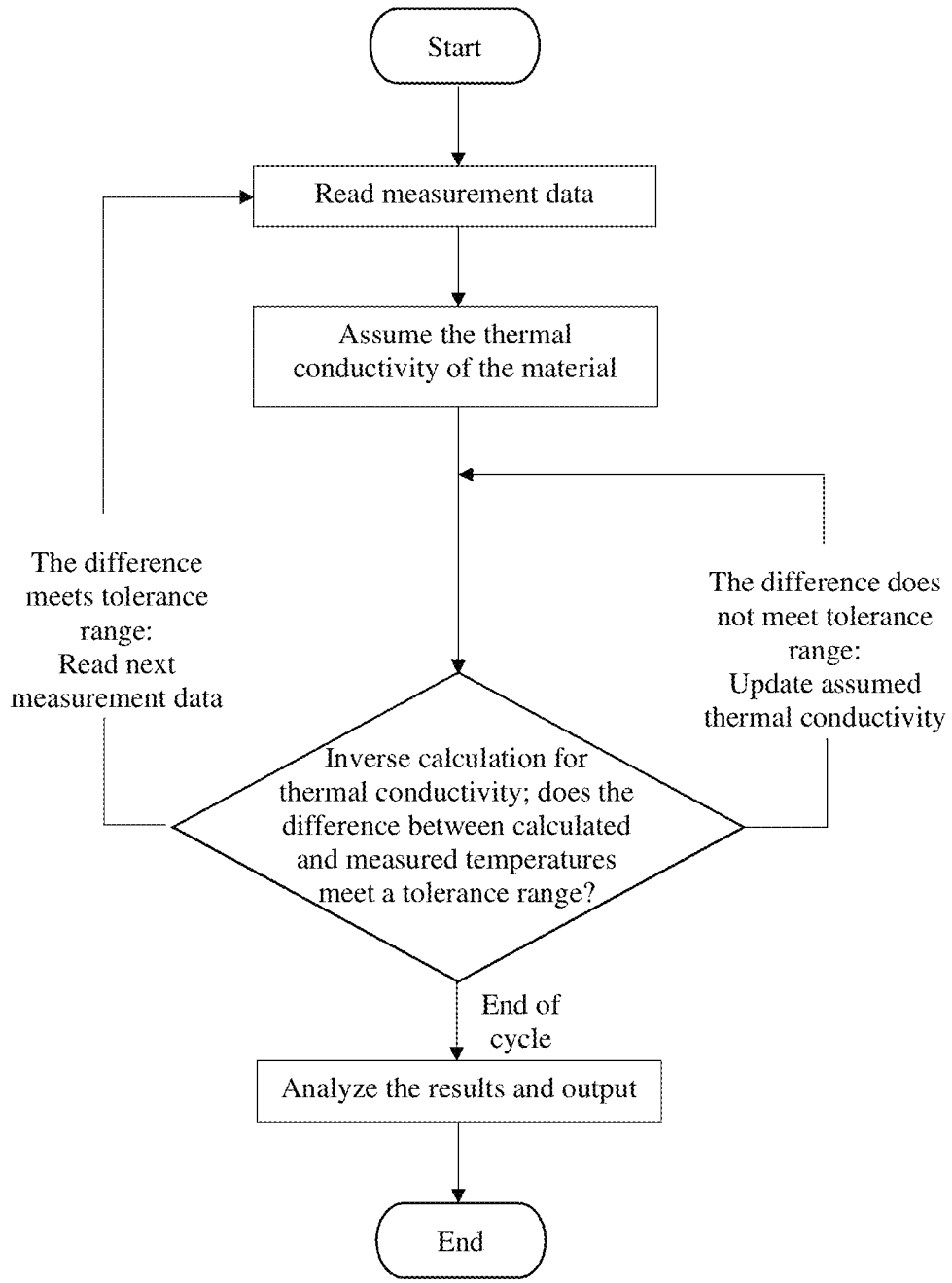
FIG. 8 is a flow chart showing the operation of the thermal conductivity output device in one embodiment of the present invention.

By using a rapid temperature measurement system to quickly measure (as shown in FIG. 7, it is the temperature distribution of the edge of a spot when a material is heated for 10 ns; it can be seen that at the edge of the spot, the temperature of the material begins to change, resulting in a temperature gradient; therefore, the point on the edge of the spot is selected for temperature measurement for thermal conductivity) the temperature at the M point position (M point is a point on the edge of the spot) in FIG. 2, a set of time-dependent temperature values $T(\tau_i)$ is obtained. Perform finite difference dispersion on equation (3), and given a hypothetical thermal conductivity, calculate the temperature value $\theta(\tau_i)$ at point M on the surface of the film at time $\tau_i$. $\theta(\tau_i)$ is compared with the measured temperature value $T(\tau_i)$, if the temperature tolerance range ($|T(\tau_i) - \theta(\tau_i)| < 2$) is not met, update the value of the assumed thermal conductivity, and recalculate. Repeat the steps. If the temperature of the calculated value reaches the tolerance range, save the value of the thermal conductivity of the current inversion calculation, then calculate the next time point. After all the measurement points have been calculated, the root mean square average of the thermal conductivity of the inversion calculation is performed. The solution flow chart is shown in FIG. 8.

The main advantages of the invention include:

(a) The structure of the apparatus is simple;

(b) The method is efficient and accurate, and the error between the thermal conductivity value output by the device of the present invention and the actual thermal conductivity value is within 5%;

(c) Provides reliable parameter data for the current thermal properties of various ultra-thin semiconductor films.

The invention is further illustrated below in conjunction with the specific embodiments. It is to be understood that the examples are not intended to limit the scope of the invention. Moreover, the drawings are schematic and thus the apparatus and devices of the present invention are not limited by the size or proportions of the drawings.

It should be noted that in the claims and the specification of the present patent, relational terms such as first and second, etc. are merely used to distinguish one entity or operation from another entity or operation. It does not necessarily require or imply any such actual relationship or order between these entities or operations. Furthermore, the term "comprises" or "include" or any other variations thereof is intended to encompass a non-exclusive inclusion. Thus, a process, method, article, or device that comprises a plurality of elements includes not only those elements but also other elements that are not explicitly listed, or elements that are inherent to such a process, method, article, or device. An element that is defined by the phrase "comprising a" does not exclude the presence of the same element in the process, method, item, or device that comprises other identical elements.

In addition, the parameters such as heating temperature and action time described herein are only used as illustrations. The laser spot size, heating temperature and time of action included in this patent are not limited to the parameter values specified in the patent.

Embodiments

Figure 5:
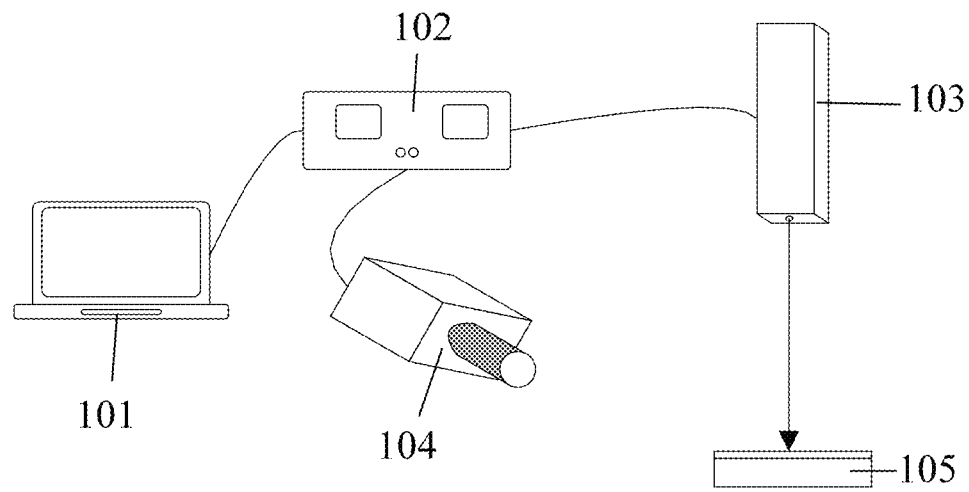
FIG. 5 is a schematic structural view of the apparatus in one embodiment of the present invention.

The apparatus for rapid measurement of thermal conductivity of a film material of the present embodiment is shown in FIG. 5. FIG. 5 shows the measurement process of the thermal conductivity of the thin film material. The control computer 101 transmits the activation signal to the clock synchronizer 102 to ensure the laser 103 and the line probe rapid thermometer 104 coordinate their operations. The laser light from the laser 103 is irradiated onto the surface of the sample 105. The line probe rapid thermometer 104 captures a series of surface temperatures at specified points of time during the heating of the sample 105 and stores them. The calculation software automatically reads in the saved data, and obtains a series of inversion calculation results in the order of the test data, and finally obtains the final calculation result.

Figure 6:
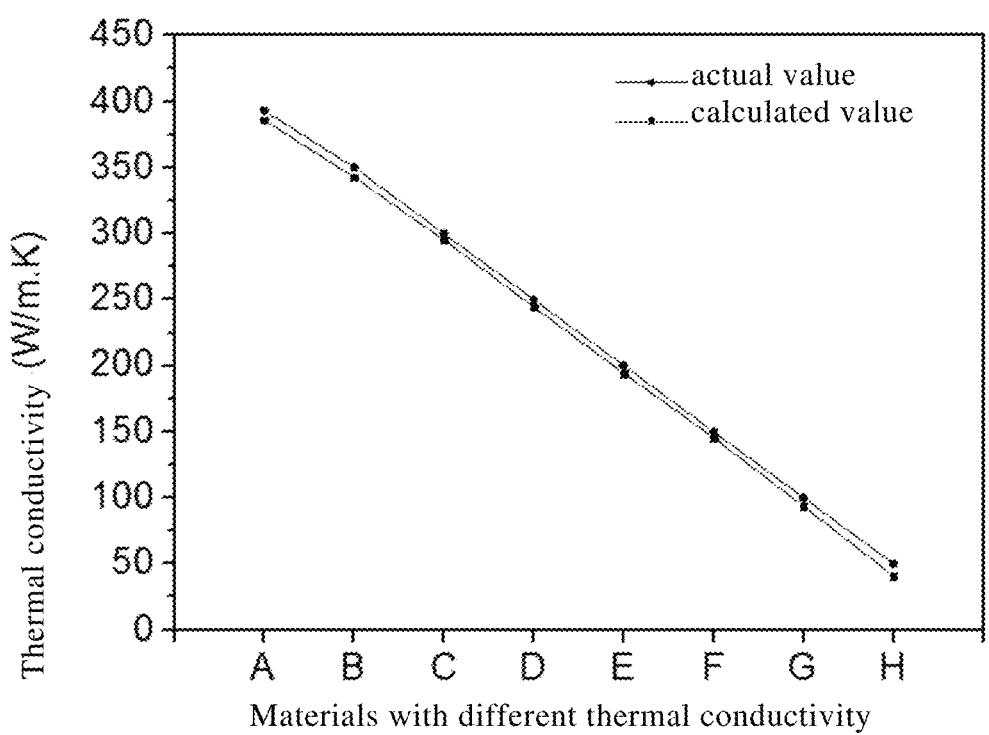
FIG. 6 is a graph comparing the thermal conductivity of different material thin films in one embodiment of the present invention.

The surface of the sample was heated by a laser having a uniform spatial intensity and a light intensity of $3.0e^{17}$ W/m$^2$, and the heating time was 10 ns. Temperature measurement data was collected for the heating process at a distance of 1 um from the edge of the spot. As shown in FIG. 6, the data of the dot indicates the true value of the material, and the square represents the calculated value after inverse calculation of the temperature measurement data. According to the calculation result shown in FIG. 6, the average thermal conductivity in a certain temperature range can be solved by the inverse operation of the heat transfer temperature. The error between the standard thermal conductivity value and the thermal conductivity value output by the apparatus of the present invention are within 5%, indicating that the apparatus for rapidly measuring the thermal conductivity of the thin film material of the present invention has higher accuracy.

All documents mentioned in the present application are incorporated herein by reference, just as each document is cited separately as a reference. In addition, it should be understood that various modifications and changes may be made by those skilled in the art. These equivalent forms are also within the scope defined by the claims appended hereto.

What is claimed is:

1. An apparatus for rapid measurement of thermal conductivity of a film material, characterized in that the apparatus comprises a control device, a clock synchronizer, a laser, a rapid thermometer and a thermal conductivity output device;

the control device is signally coupled to the clock synchronizer, and the clock synchronizer is simultaneously signally coupled to the laser and the rapid thermometer; in an operating state, the control device sends a start signal to the clock synchronizer, the laser and the fast thermometer coordinately cooperate, the laser emits laser light to the surface of the sample, and at the same time, the rapid thermometer captures a surface temperature of the sample at the same specified position at different points in time during heating of the sample, and inputs the measured data to the thermal conductivity output device to obtain a thermal conductivity parameter.

2. The apparatus of claim 1, characterized in that the rapid thermometer is signally coupled to the thermal conductivity output device, and the thermal conductivity output device automatically reads data measured by the rapid thermometer.

3. The apparatus of claim 1, characterized in that the thermal conductivity output device comprises a display for displaying the thermal conductivity value.

4. The apparatus of claim 1, characterized in that the control device and the thermal conductivity output device are the same computer.

5. The apparatus of claim 1, characterized in that the rapid thermometer is a line probe rapid thermometer.

6. The apparatus of claim 1, characterized in that the sample includes a thin film and a substrate, the thin film covering a surface of the substrate, and the laser is irradiated onto the thin film.

7. A method for rapid measurement of thermal conductivity of a thin film material, characterized in that:
a) providing the apparatus of claim 6, rapidly heating the sample with a laser, and measuring the surface temperature of the sample at the same specified position at different time points during the heating process by a rapid thermometer;
b) based on the data measured from the rapid thermometer, obtaining a set of surface temperature values $T(\tau_i)$ of the sample at the same specified position at different time points during the heating of the sample; where i is the ith time point, and $1 \leq i$;
c) assume a thermal conductivity corresponding to time point $\tau_i$, and calculating the surface temperature value $\theta(\tau_i)$ of the sample by the following heat transfer formula:

$$\lambda \left( \frac{1}{r} \frac{\partial T}{\partial r} + \frac{\partial^2 T}{\partial r^2} \right) + E = \rho c \frac{\partial T}{\partial \tau}$$

where $\lambda$ is the thermal conductivity of the thin film, $\rho$ is the density of the thin film, c is the specific heat capacity of the thin film, E is the heat flux density of the laser, and the value of E is zero in the area outside the spot;
d) compare $T(\tau_i)$ and $\theta(\tau_i)$, determine if $|T(\tau_i)-\theta(\tau_i)|<2$;
e) if $|T(\tau_i)-\theta(\tau_i)|<2$ is established, save the corresponding thermal conductivity $\theta(\tau_i)$, and calculate the next time point;
f) if $|T(\tau_i)-\theta(\tau_i)|<2$ is not established, re-assume the thermal conductivity corresponding to the time point $\tau_i$, repeat step b) and step c) until $|T(\tau_i)-\theta(\tau_i)|<2$ is established; save the corresponding thermal conductivity $\theta(\tau_i)$, and calculate the next time point;
g) when all the i time points are calculated, root mean square average of all calculated thermal conductivities, the average thermal conductivity of the film is finally obtained.

8. The method of claim 7, characterized in that the method is based on laser heating, and the heat conduction process of the thin film conforms to the Fourier heat conduction law, and the heating process of the laser in the circular region is simplified to the one-dimensional heat conduction process in the cylindrical coordinate system.

9. The method of claim 7, characterized in that the method is to obtain the thermal conductivity of the thin film by solving the heat conduction equation in the reverse direction.

10. The apparatus of claim 1, characterized in that the workflow of the thermal conductivity output device is:
 a) based on the data measured from the rapid thermometer, obtaining a set of surface temperature values $T(\tau_i)$ of the sample at the same specified position at different time points during the heating of the sample; where i is the ith time point, and $1 \leq i$;
 b) assume a thermal conductivity corresponding to time point $\tau_i$, and calculating the surface temperature value $\theta(\tau_i)$ of the sample by the following heat transfer formula:

$$\lambda \left( \frac{1}{r} \frac{\partial T}{\partial r} + \frac{\partial^2 T}{\partial r^2} \right) + E = \rho c \frac{\partial T}{\partial \tau}$$

where $\lambda$ is the thermal conductivity of the thin film, p is the density of the thin film, c is the specific heat capacity of the thin film, E is the heat flux density of the laser, and the value of E is zero in the area outside the spot;

c) compare $T(\tau_i)$ and $\theta(\tau_i)$, determine if $|T(\tau_i)-\theta(\tau_i)|<2$;
 d) if $|T(\tau_i)-\theta(\tau_i)|<2$ is established, save the corresponding thermal conductivity $\theta(\tau_i)$, and calculate the next time point;
 e) if $|T(\tau_i)-\theta(\tau_i)|<2$ is not established, re-assume the thermal conductivity corresponding to the time point $\tau_i$, repeat step b) and step c) until $|T(\tau_i)-\theta(\tau_i)|<2$ is established; save the corresponding thermal conductivity $\theta(\tau_i)$, and calculate the next time point;
 f) when all the i time points are calculated, root mean square average of all calculated thermal conductivities, the average thermal conductivity of the film is finally obtained.

\* \* \* \* \*